US009227594B2

(12) United States Patent
Reed et al.

(10) Patent No.: US 9,227,594 B2
(45) Date of Patent: Jan. 5, 2016

(54) RESISTANCE-BASED CATALYTIC CONVERTER PROTECTION SYSTEMS AND CONFIGURATIONS

(71) Applicant: Ford Global Technologies, LLC, Dearborn, MI (US)

(72) Inventors: Eric L. Reed, Livonia, MI (US); Don D. Price, Northville, MI (US); John R. Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 13/726,441

(22) Filed: Dec. 24, 2012

(65) Prior Publication Data

US 2014/0176320 A1    Jun. 26, 2014

(51) Int. Cl.
*B60R 25/10* (2013.01)
*F01N 3/28* (2006.01)

(52) U.S. Cl.
CPC .............. *B60R 25/1004* (2013.01); *F01N 3/28* (2013.01); *F01N 2260/22* (2013.01); *Y02T 10/47* (2013.01)

(58) Field of Classification Search
USPC ................... 340/426.24; 123/198 F, 198 DB
See application file for complete search history.

(56) References Cited

U.S. PATENT DOCUMENTS

| | | | |
|---|---|---|---|
| 4,024,850 A * | 5/1977 | Peter et al. | 123/198 F |
| 5,224,335 A * | 7/1993 | Yoshizaki | 60/300 |
| 5,612,878 A | 3/1997 | Joao et al. | |
| 5,839,081 A | 11/1998 | Joao et al. | |
| 6,739,311 B1 | 5/2004 | Kingsley | |
| 8,002,232 B2 | 8/2011 | Meislahn | |
| 2007/0251061 A1 | 11/2007 | Heiselbetz | |
| 2011/0036130 A1 | 2/2011 | Hisler | |

FOREIGN PATENT DOCUMENTS

| | | |
|---|---|---|
| JP | 2007138837 A | 6/2007 |
| WO | 0061265 | 10/2000 |

OTHER PUBLICATIONS

AA1Car, Catalytic Converter, http://www.aa1car.com, last accessed Mar. 21, 2011, 6 pages, http://www.aa1car.com/library/converter.htm.
Wikipedia, Catalytic Converter, http://en.wikipedia.org, last accessed Mar. 21, 2011, 10 pages, http://en.wikipedia.org/wiki/Catalytic_converter.
Nationwide, printed Dec. 24, 2012, "Business Alert: Catalytic Converter Theft," http://www.nationwide.com/catalytic-converter-theft.jsp.
Edmunds.com, printed Dec. 24, 2012, "In Under Two Minutes: Catalytic Converter Theft," http://www.edmunds.com/auto-insurance/in-under-two-minutes-catalytic-converter-theft . . .

* cited by examiner

*Primary Examiner* — Daryl Pope
(74) *Attorney, Agent, or Firm* — Frank MacKenzie; Price Heneveld LLP (57) ABSTRACT

A catalytic converter protection system that includes a controller, a catalytic converter having a housing, and a shorting element that has two terminals and is coupled to the housing. The system also includes a connector having an internal resistor. The connector is electrically coupled to the controller and the two terminals. The controller monitors resistance of the internal resistor to determine continuity between the connector and the shorting element. The controller may activate an alarm element with a loss in continuity between the terminals and the shorting element.

20 Claims, 10 Drawing Sheets

RESISTANCE-BASED CATALYTIC CONVERTER PROTECTION SYSTEMS AND CONFIGURATIONS

FIELD OF THE INVENTION

The present invention generally relates to systems for protecting vehicular components, particularly catalytic converters, from tampering and theft.

BACKGROUND OF THE INVENTION

Over the past decade, a rise in the cost of precious metals (e.g., platinum, palladium, rhodium and gold) has spurred an increase in thefts of catalytic converters used in vehicles. The catalytic converters used in most automobiles contain precious metals. Thieves have been known to physically remove catalytic converters from the underside of parked vehicles. The threat to vehicle dealerships is acute, as many dealerships possess hundreds of vehicles parked in showrooms and outdoor lots. Trucks, vans and SUVs are particularly vulnerable to catalytic converter theft as these vehicles sit high off of the ground. The replacement cost for a catalytic converter can exceed $1000, not including the costs associated with inoperability of the vehicle until repair.

Known approaches to deterring and/or preventing the theft of catalytic converters rely on devices and components that mechanically secure the converter to the vehicle. These devices and components may consist of a series of cables, clamps and the like designed to attach the converter to the vehicle in a configuration that cannot be readily removed by a would-be thief. These components and devices are fairly expensive and may approach $300, up to a third of the replacement cost of the catalytic converter. In addition, these mechanically-oriented catalytic converter theft deterrent and preventions systems can add appreciable weight to the vehicle with an adverse effect on fuel efficiency.

SUMMARY OF THE INVENTION

One aspect of the present invention is to provide a catalytic converter protection system that includes a controller, a catalytic converter having a housing, and a shorting element that has two terminals and is coupled to the housing. The system also includes a connector having an internal resistor. The connector is electrically coupled to the controller and the two terminals. The controller monitors resistance of the internal resistor to determine continuity between the connector and the shorting element.

Another aspect of the present invention is to provide a catalytic converter protection system that includes a vehicle alarm system having a controller, a catalytic converter having a housing, and a shorting element that has two terminals and is coupled to the housing. The system also includes a connector having an embedded resistor, and the connector is electrically coupled to the controller and the two terminals. The controller determines continuity of the alarm system and the continuity between the connector and the shorting element.

A further aspect of the present invention is to provide a catalytic converter protection system that includes a controller, a catalytic converter having a housing, and a shorting element that has two terminals and is coupled to the housing. The system also includes a connector having a resistor with a pre-set resistance, and the connector is connected to the controller and the terminals. The controller determines continuity between the connector and the shorting element by measuring a resistance of the resistor and comparing it to the pre-set resistance.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
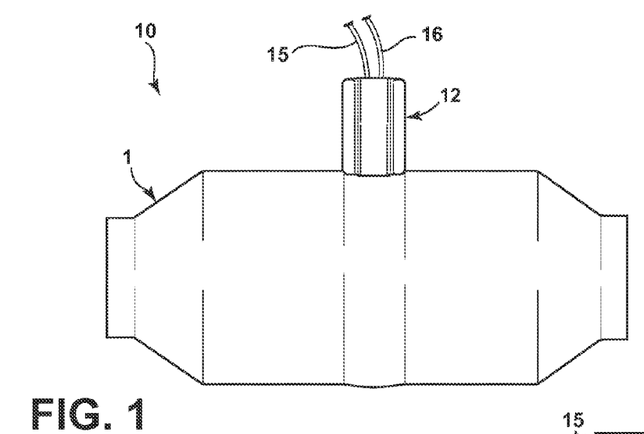
FIG. 1 is a side view of a catalytic converter protection system according to one embodiment.

For purposes of description herein, the terms "upper," "lower," "right," "left," "rear," "front," "vertical," "horizontal," and derivatives thereof shall relate to the invention as oriented in FIG. 1. However, the invention may assume various alternative orientations, except where expressly specified to the contrary. Also, the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
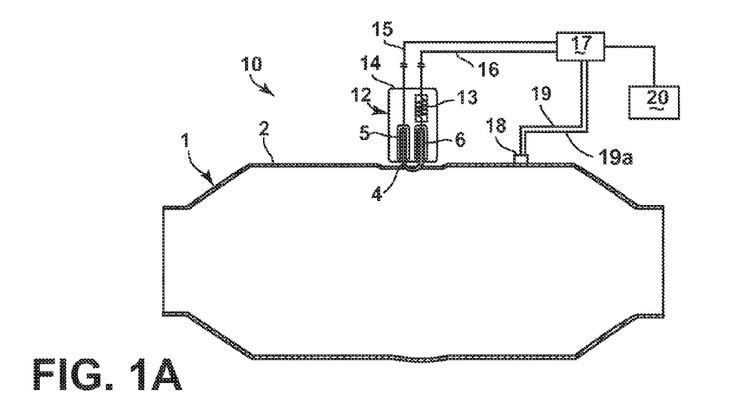
FIG. 1A is a schematic diagram of the catalytic converter protection system depicted in FIG. 1.

Referring to FIGS. 1 and 1A, a catalytic converter protection system 10 is depicted as-configured on a catalytic converter 1 according to one embodiment. The converter 1 is a typical catalytic converter used in various vehicles with gas-combustion engines with a housing 2. The housing 2 may be constructed from a heat-conducting and/or electrically conductive material. Catalytic converter protection system 10 further includes a shorting element 4 that is coupled to the housing 2 and has two terminals 5 and 6. The system 10 further includes a connector 12 containing a resistive element 13. The connector 12 includes connections 15 and 16 that are electrically coupled to terminals 5 and 6, respectively. Hence, connector 12 is electrically coupled to the shorting element 4 via terminals 5 and 6. In addition, the resistive element 13 within connector 12 is coupled to connection 16 as shown in FIGS. 1 and 1A. However, resistive element 13 may be coupled to connection 15.

Catalytic converter protection system 10 further includes a controller 17 as shown in FIG. 1A. Connections 15 and 16, emanating from connector 12, are electrically coupled to controller 17. The controller 17 may be a known microprocessor and may be configured to monitor the electrical resistance of the resistive element 13 within connector 12, or the current value through connection 15 or 16. By monitoring the resistance of element 13 or the current value, controller 17 can evaluate the electrical continuity between the connector 12 and the shorting element 4. In particular, controller 17 may monitor the resistance or current randomly, at pre-set intervals, continuously or along other prescribed monitoring patterns. Preferably, controller 17 monitors the resistance of resistive element 13 or current in a near-continuous fashion, limited only by the data gathering and collection ability of the components employed in system 10. Further, controller 17 can monitor the resistance of resistive element 13 or the current value by assessing these inputs as a function of time and/or their relative changes in magnitude over time to evaluate the continuity between connector 12 and element 4. For example, controller 17 can monitor the resistance over time to detect the presence of a large resistance over time, likely indicative of a theft or tampering event associated with converter 1.

As depicted in FIG. 1A, shorting element 4 may be configured in a jumper-like configuration. In particular, the terminals 5 and 6 of shorting element 4 may be welded, soldered, bonded, fastened, riveted or otherwise attached to the housing 2 of catalytic converter 1. Although shorting element 4 is depicted at a location centered on the top of catalytic converter 1, it may be located in various locations along the housing 2. For purposes of catalytic converter theft deterrence, it may be preferable to locate the shorting element 4 at a location on housing 2 that is readily viewable by a would-be thief or other person not authorized to tamper with the catalytic converter 1. Appropriate signage may be included near element 4 to augment the deterrent effect. Nevertheless, it may also be desirable to locate the shorting element 4 or housing 2 out of view to reduce the likelihood of tampering.

Referring to connector 12, it may further include a connector body 14 that can house, encapsulate or otherwise embed the resistive element 13. Connector body 14 may be fabricated from various electrically insulating materials not susceptible to thermal degradation (e.g., heat-resistant ceramics and polymers). Additionally, the electrical connections should be mechanically fastened (e.g., welded or crimped), not secured by solder. This is because connector body 14 may be subjected to relatively high temperatures associated with the operation of catalytic converter 1. Accordingly, connector body 14 can be made from heat-resistant polymers and ceramic materials. The connections 15 and 16, including all wire associated with them, can be made from high temperature materials with poor thermal conductivity (e.g., nickel-plated stainless steel) to prevent heat from being conducted down the connections 15 and 16 and damaging components connected to these elements.

Figure 1B:
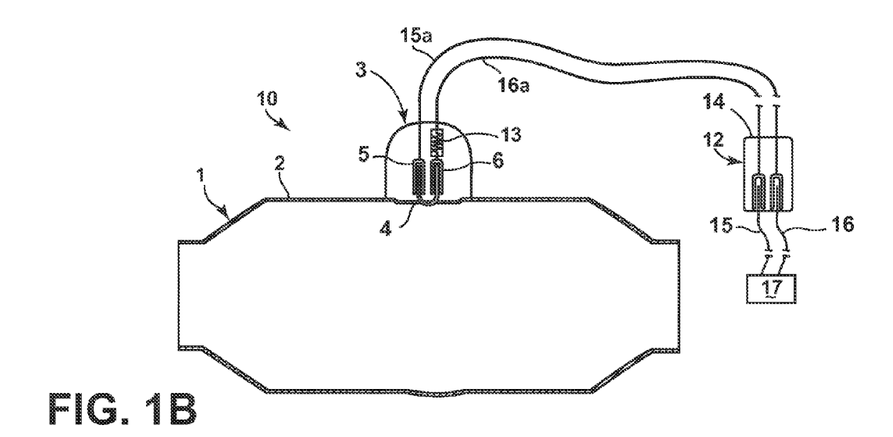
FIG. 1B is a schematic diagram of the catalytic protection system depicted in FIG. 1, modified for additional high-temperature capability according to a further embodiment.

Alternatively, shorting element 4 can be separated from connector 12 for improved high temperature capability as shown in FIG. 1B. In this configuration of protection system 10, shorting element 4 is attached to housing 2 of converter 1 in much the same way as the same elements associated with the configuration of system 10 depicted in FIGS. 1 and 1A. Here in FIG. 1B, however, terminals 5 and 6 are connected directly to connections 15a and 16a (e.g., through crimping, soldering, welding or other types of electrical connections). Connections 15a and 16a may be fabricated from high temperature-resistant wires (e.g., nickel-plated stainless steel). Resistive element 13 is located near the junction between terminal 6 and connection 16a. In addition, a high temperature-capable encapsulant 3 can be placed over the shorting element 4, resistive element 13, terminals 5 and 6, and the junction between terminals 5 and 6 and connections 15a and 16a. Connections 15a and 16a are then connected to connector 12 (including connector body 14), located away from the converter 2. Connections 15 and 16 are electrically coupled to connections 15a and 16a, respectively, within connector 12. Connections 15 and 16, connector 12, and connector body 14 are therefore less susceptible to the high temperatures associated with converter 2 during vehicle operation. Consequently, less temperature-resistant materials may be used for these components.

The resistive element 13 employed in catalytic converter protection system 10 can be configured with one or more resistors (see FIG. 1A). Resistive element 13 may be configured to provide electrical resistance within a large resistance range (e.g., from 100 to 5000 ohms). However, controller 17, connections 15 and 16, and terminals 5 and 6 should be configured to detect the predetermined or pre-selected resistance of resistive element 13, along with slight perturbations and deviations from this resistance level. In addition, the resistance level of resistive element 13 is preferably maintained with some secrecy such that would-be thieves or other individuals not permitted to modify, tamper or otherwise alter catalytic converter 1 cannot readily develop methods to defeat system 10.

Figure 4:
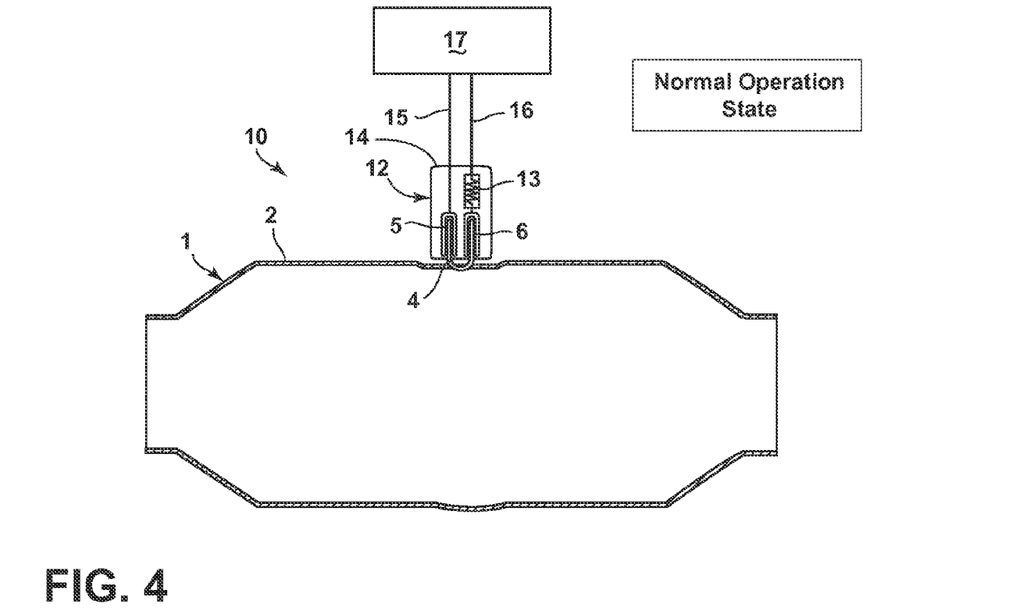
FIG. 4 is a schematic diagram of the normal state operation of the catalytic converter protection system depicted in FIG. 1.
Figure 4A:
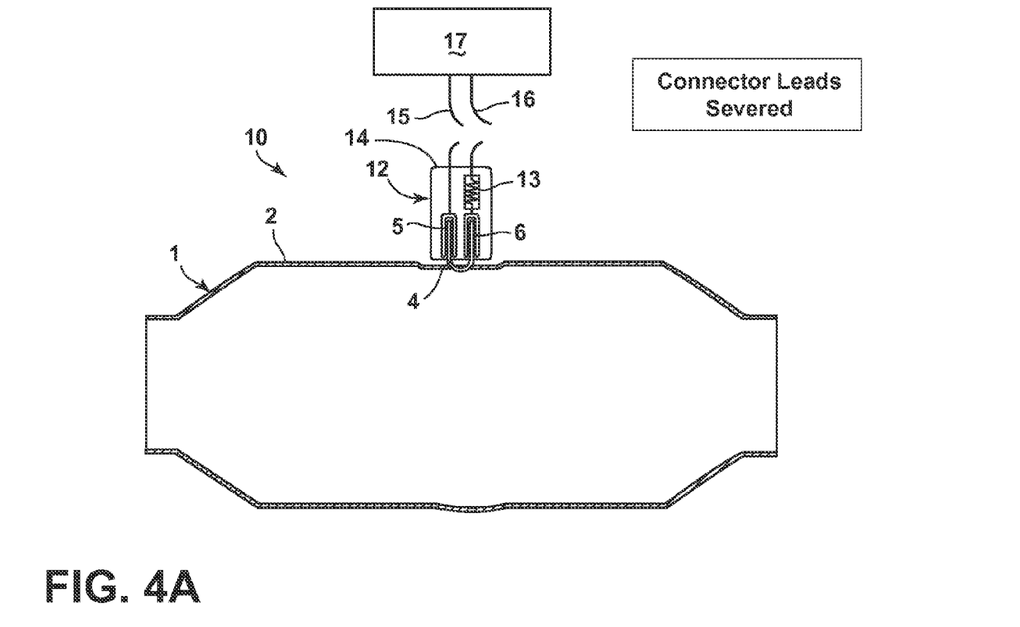
FIG. 4A is a schematic diagram of the catalytic converter protection system depicted in FIG. 1 with the leads to the connector severed.
Figure 4B:
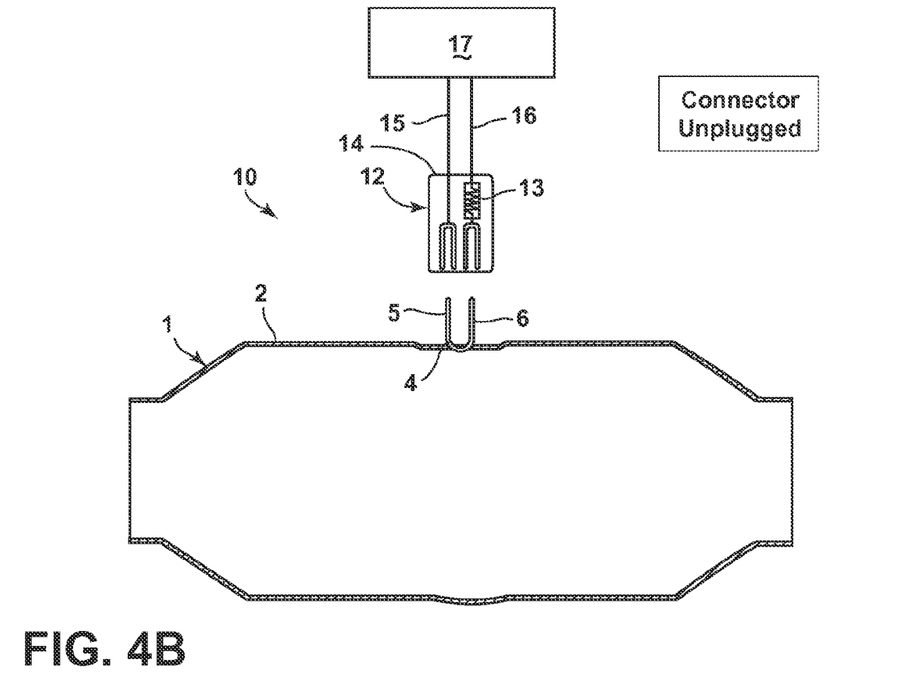
FIG. 4B is a schematic diagram of the catalytic converter protection system depicted in FIG. 1 with the connector unplugged.

As shown in FIGS. 4-4D, the catalytic converter protection system 10 operates to detect theft and/or tampering of catalytic converter 1. In its normal operational state, controller 17 detects the particular resistance of resistive element 13 (e.g., 1000 ohms) within the circuit defined by terminals 5 and 6 and connections 15 and 16 (FIG. 4). If an individual tampers with catalytic converter 1 by cutting either one or both of the connections 15 and 16, controller 17 will detect this event as an open circuit or infinite resistance (see FIG. 4A). Similarly, if connector 12 is physically unplugged from shorting element 4 (see FIG. 4B), e.g., by removal of catalytic converter 1 from the vehicle (not shown), an open circuit or infinite resistance will be detected by controller 17. Both of these conditions likely correspond to theft and/or tampering with catalytic converter 1, necessitating further action by controller 17 as described in further detail below.

Figure 4C:
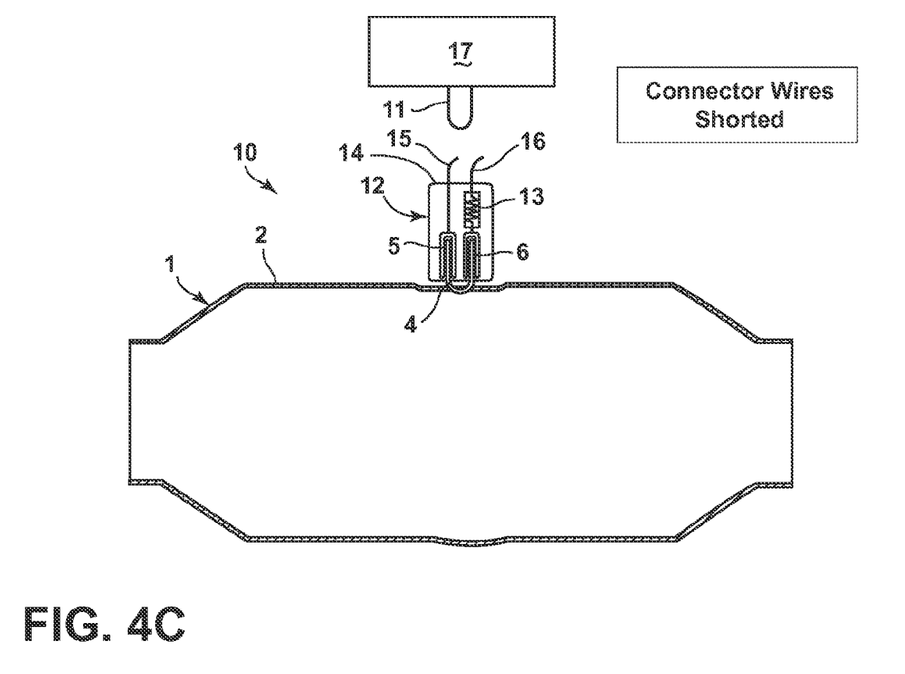
FIG. 4C is a schematic diagram of the catalytic converter protection system depicted in FIG. 1 with the leads to the connector shorted.
Figure 4D:
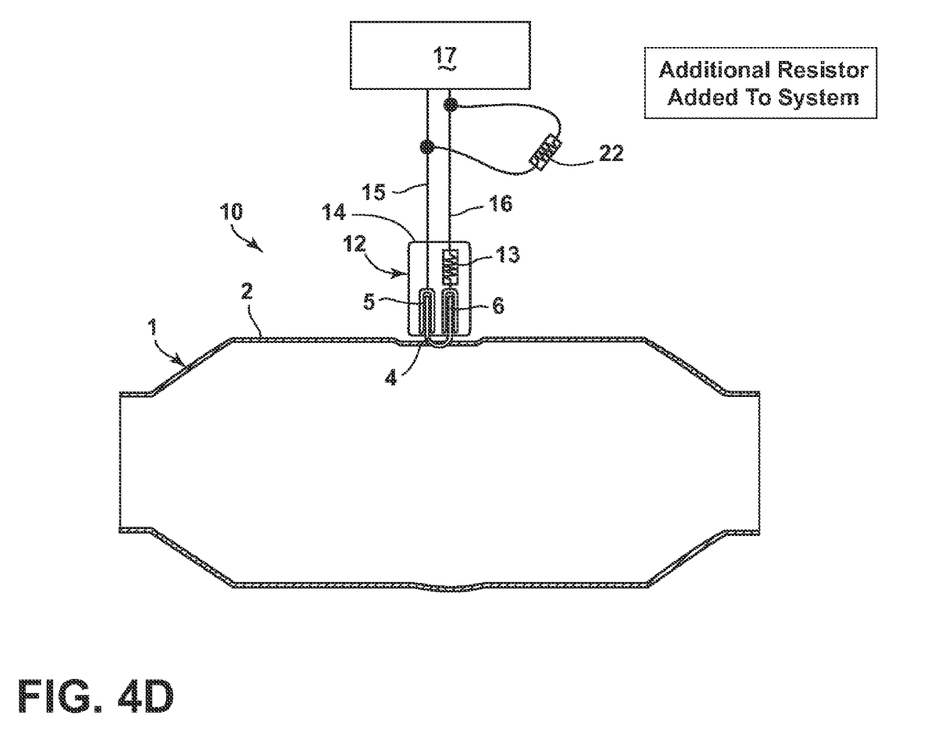
FIG. 4D is a schematic diagram of the catalytic converter protection system depicted in FIG. 1 with an additional resistor added in an attempt to defeat the system.

Referring to FIG. 4C, an individual may attempt to defeat the catalytic converter protection system 10 by shorting connections 15 and 16. As shown, for example, the connections 15 and 16 may be shorted with a jumper 11 in direct connection to controller 17, or by first installing jumper 11 and then severing connections 15 and 16. These actions, however, will not defeat protection system 10 because controller 17 will detect approximately zero ohms of resistance from the installation of the jumper 11 element. Controller 17 will thus recognize that the standard resistance from resistive element 13 is not present in the circuit. Similarly, an individual may attempt to defeat system 10 by installing an extra-system resistive element 22 within the circuit defined by resistive element 13, terminals 5 and 6, and connections 15 and 16 (FIG. 4D). In this instance, controller 17 will still detect a different resistance than that prescribed by resistive element 13. For example, if resistive element 13 and extra-system resistive element 22 each possess 1000 ohms resistance, controller 17 will detect approximately 500 ohms of resistance (i.e., circuit resistance=1/(1/1000 ohms+1/1000 ohms)=500 ohms). The conditions depicted in FIGS. 4C and 4D both likely correspond to theft and/or tampering with catalytic converter 1, necessitating further action by controller 17 described in further detail below.

Catalytic converter protection system 10 and, more particularly, the controller 17 may also account for changes in the resistance of resistive element 13 associated with temperature. Indeed, the resistance of resistive element 13 will vary to some degree as a function of temperature in a predictable fashion, usually over a significant time period. Accordingly, this temperature-related effect can be accounted for by controller 17 as drift that should be filtered out in its schemes, algorithms and the like used to detect changes in resistance in the circuit defined by terminals 5 and 6 and connections 15 and 16. In other words, controller 17 can filter out temperature-related drift to ensure that the more significant changes in detected resistance in the circuit are actually associated with theft and/or tampering with catalytic converter.

System 10 optionally may also include a temperature sensor 18 mounted, coupled or otherwise attached to the housing 2 of converter 1, and coupled to controller 17 via connections 19 and 19a (see FIG. 1A). Controller 17 can then receive signals from temperature sensor 18 via connections 19 and 19a that are associated with the approximate temperature of the surface of catalytic converter 1, a temperature that correlates to the temperature of the resistive element 13 within connector 12. Controller 17 can then use this data to filter out temperature-related drift. Additionally, if the measured resistance of resistive element 13 does not correlate to the expected resistance for element 13 based on the measured temperature via sensor 18, controller 17 may also conclude that shorting element 4 has been broken away from the housing 2 of converter 1 (without losing its own integrity). This scenario may then be flagged as a theft or tampering event by controller 17. Further, controller 17 may use this relationship to detect the integrity of the system 10 before allowing an arming event for system 10.

Catalytic converter protection system 10 may also include an alarm element 20, as shown in FIG. 1A. Alarm element 20 is connected to controller 17. Depending on the resistance detected by controller 17 in the circuit defined by terminals 5 and 6 and connections 15 and 16, controller may 17 may activate alarm element 20. Any of the situations depicted in FIGS. 4A-4D may prompt activation of alarm element 20. For example, the detection of an open circuit or infinite resistance by controller 17 can prompt it to activate alarm element 20.

Alarm element 20 may be configured as an audible device (e.g., horn) or a visual device (e.g., flashing or strobe lights). Alarm element 20 may also be configured comparable to known vehicular anti-theft signaling components and schemes (e.g., an alternating sequence of headlight, tail-light and other signal light flashing followed by a sequence of audible horn signals). Alarm element 20 may also include wireless transmitter devices that notify governmental authorities, the vehicle owner and/or other responsible parties (e.g., a commercial anti-theft service) upon the measurement of an improper resistance level by controller 17. When wireless devices are incorporated into alarm element 20, system 10 may also be configured to be silent and without visual indication at the vehicle in order to improve the chances of apprehending a converter thief or vandal in action. Alarm element 20 may even include camera devices (not shown) mounted in proximity to the catalytic converter 1 to obtain photographic evidence of the would-be thief and/or other unauthorized individuals.

Figure 2:
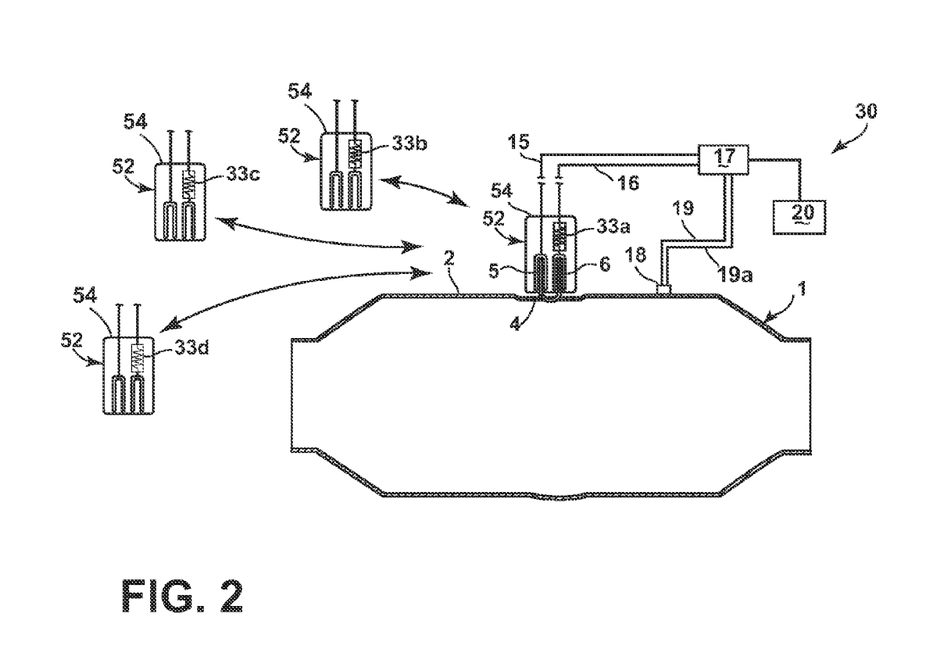
FIG. 2 is a schematic diagram of a dynamic resistance-based catalytic converter protection system according to another embodiment.

According to another embodiment, catalytic converter protection system 30 is depicted in FIG. 2. Protection system 30 is arranged in a configuration similar to protection system 10 with the same components, unless otherwise noted below. Protection system 30, however, relies on one of a plurality of connectors 52, each with a connector body 54 housing one of a series of resistive elements 33a, 33b, 33c, 33d, etc. (see FIG. 2). Connectors 52 and connector body 54 (FIG. 2) are comparable to the connectors 12 and connector bodies 14 described earlier in connection with the embodiment depicted in FIGS. 1, 1A. Resistive elements 33a, 33b, 33c, and 33d (and others) each possess a finite, predetermined resistance. In particular, the elements 33a-33d (and others) may each possess one resistance value, selected from a fixed number of random values from the factory. Preferably, the resistance values for each of the resistive elements 33a, 33b, 33c, and 33d (and any others) differ from one another.

When system 30 is initially configured within a vehicle (not shown), a manufacturer can select one of the resistive elements 33a-33d for use in the connector 52 according to a random, arbitrary or some other pre-set pattern. Upon initialization of system 30, controller 17 may detect the resistance of the resistive element 33a, 33b, 33c, 33d (or others) configured within connector 52 and set that resistance as its threshold resistance level. During operation of system 30, controller 17 can then measure the resistance of the circuit defined by terminals 5 and 6 (of shorting element 4), connections 15 and 16, and resistive element 33a, 33b, 33c, 33d or another resistive element installed within connector 52. Controller 17 can then compare the measured resistance to the threshold resistance level it measured upon initialization (i.e., the pre-set resistance level that corresponds to the resistive element 33a, 33b, 33c, 33d, etc.). When controller 17 detects a change in resistance according to a scenario comparable to those depicted in FIGS. 4A-4D, it may then activate an alarm element 20 as shown in FIG. 2.

As such, catalytic converter protection system 30 operates in a manner similar to that of protection system 10. Protection system 30, however, is even more difficult to bypass by a would-be thief or other individual not authorized to tamper with converter 1. It will be much more difficult for unauthorized individuals to ascertain or obtain the resistance level of the resistive element (e.g., resistive elements 33a, 33b, 33c, and/or 33d) for a given vehicle in order to devise ways to defeat the system. For protection system 30, the resistance levels of the resistive element 33a-33d can vary as a function of vehicle, production date or other pattern unbeknownst to such an individual. Moreover, a vehicle owner could conceivably swap out a connector 52 with one resistive element 33a with another connector 52 containing a different resistive element 33b, for example, much as one might periodically change the password on a personal computer or email account.

Figure 3:
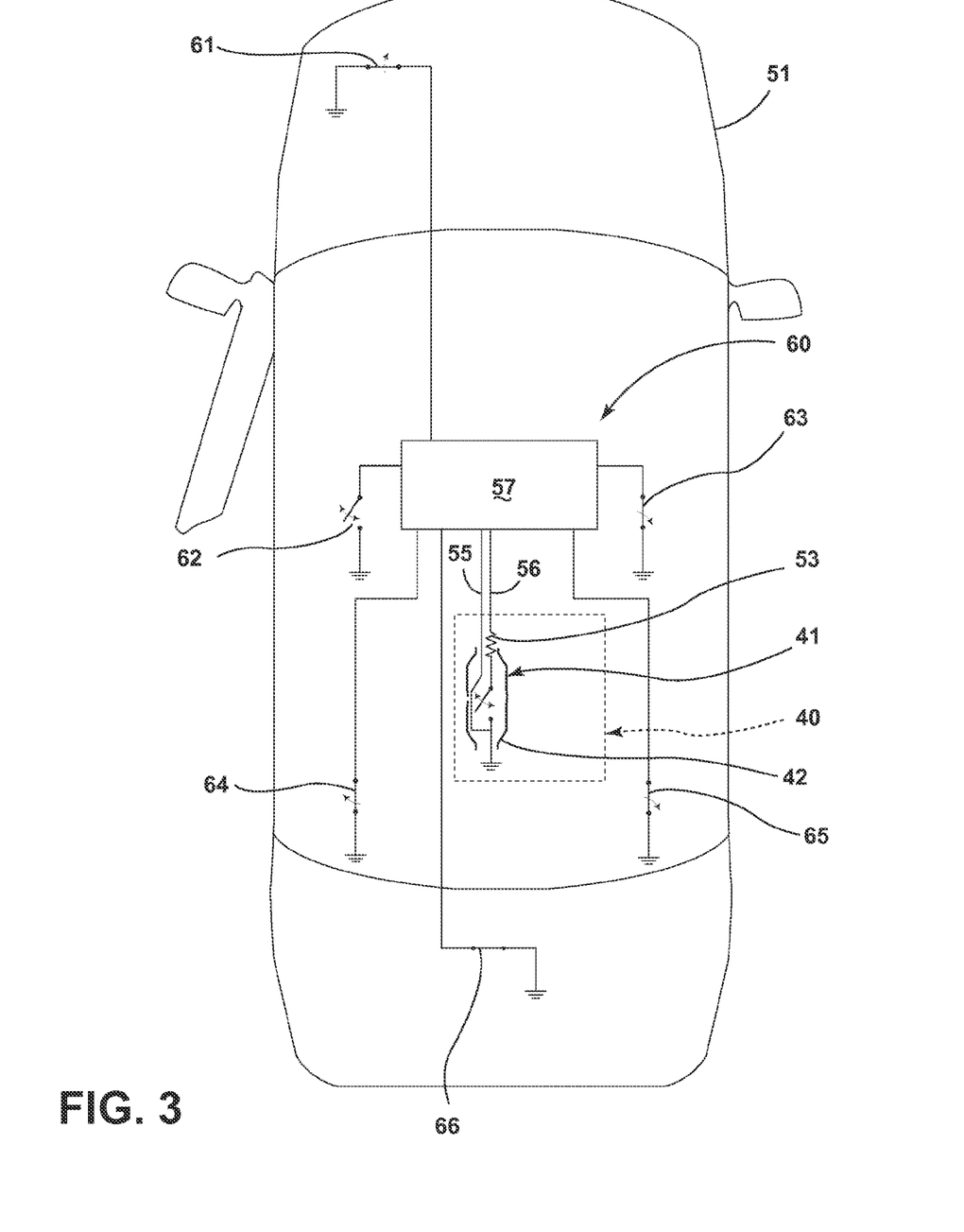
FIG. 3 is a schematic diagram of a catalytic converter protection system that is configured within a vehicular anti-theft system according to a further embodiment.
Figure 3A:
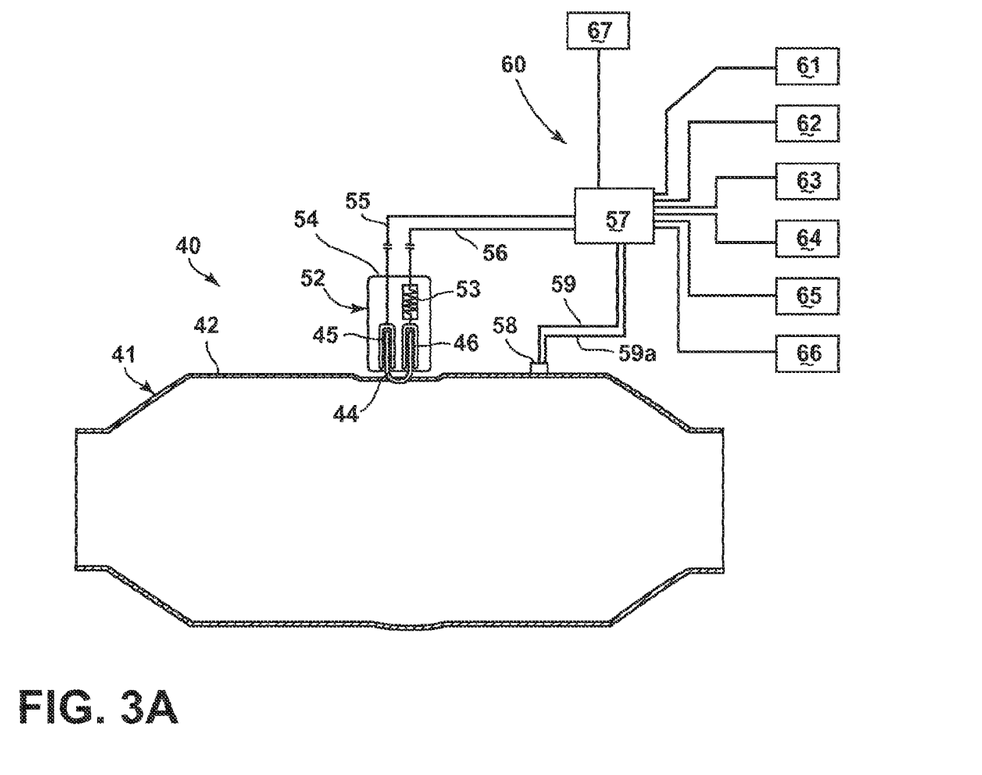
FIG. 3A is a schematic diagram of the catalytic converter protection system depicted in FIG. 3.

A catalytic converter protection system 40 may be integrated within a vehicle anti-theft system 60 as shown in FIGS. 3 and 3A according to a further embodiment. Systems 40 and 60 are arranged within vehicle 51. Protection system 40 operates, and is configured comparably to, the protection system 10 depicted earlier in FIGS. 1 and 1A. System 40 includes a catalytic converter 41 having a housing 42, and a shorting element 44 that is coupled to the housing 42 and has two terminals 45 and 46. System 40 also includes a connector 52 having an embedded resistive element 53 and connector body 54. The connector 52 also includes connections 55 and 56, arranged to electrically couple controller 57 with connector 52. Connections 55 and 56 are arranged in electrical connection with terminals 45 and 46, respectively.

As shown in FIGS. 3 and 3A, controller 57 is also coupled to various aspects of vehicle anti-theft system 60. In particular, controller 57 is coupled to hood ajar circuit 61, left front door ajar circuit 62, right front door ajar circuit 63, left rear door ajar circuit 64, right rear door ajar circuit 65, and lift gate ajar circuit 66. Controller 57, arranged in this fashion, can detect breaks in the electrical continuity in any of the circuits 61-66, indicative of tampering and other unauthorized incursions within vehicle 51. Note that only left front door ajar circuit 62 is open as shown in FIG. 3 because the driver's side door has been opened.

In addition, controller 57 can assess the continuity of the circuit defined by shorting element 44, terminals 45 and 46, connections 55 and 56, and resistive element 53, by monitoring the resistance in this circuit. The monitoring efforts by controller 57 to assess tampering with catalytic converter 41 within system 40 are comparable to those engaged by controller 17 in connection with catalytic converter 1 (see, e.g., FIGS. 1, 1A and 4-4D). In particular, controller 57 may assess the resistance between connector 52 and shorting element 44 to ascertain whether there is change in resistance relative to the baseline resistance of resistive element 53.

Controller 57 may also be electrically coupled to an alarm element 67. More specifically, controller 57 may activate alarm element 67 in response to a loss in continuity between connector 52 and shorting element 44. Such an action by controller 57 is comparable to the activation of alarm element 20 by controller 17 in protection system 10. In addition, controller 57 may activate alarm element 67 upon a break in continuity between controller 57 and circuits 61, 62, 63, 64, 65 and/or 66. It should also be understood that alarm element 67 is a device or system of components comparable to alarm element 20 outlined earlier.

Optionally, the controller 57 of protection system 40 may also be electrically coupled to temperature sensor 58 via connections 59 and 59a. Temperature sensor 58 may be mounted, coupled or otherwise attached to the housing 42 of converter 41, and coupled to controller 57 (see FIG. 3A). Controller 57 can then receive signals from sensor 58 via connections 59 and 59a that are associated with the approximate temperature of the surface of catalytic converter 41, a temperature that correlates to the temperature of the resistive element 53 within connector 52. Using this data from temperature sensor 58, controller 57 can account for temperature-related effects while evaluating and monitoring the relative changes in resistance within the circuit defined by shorting element 44, terminals 45 and 46, connections 55 and 56, and resistive element 53. Also, as described earlier in connection with controller 17, the controller 57 may also filter temperature-related drift by employing known temperature-dependent resistance relationships vs. time in its detection algorithms. Additionally, if the measured resistance of resistive element 53 does not correlate to the expected resistance for element 53 based on the measured temperature via sensor 58, controller 57 may also conclude that shorting element 44 has been broken away from the housing 42 of converter 41 (without losing its own continuity). This scenario may then be flagged as a theft or tampering event by controller 57. Further, controller 57 may use this relationship to detect the integrity of the system 40 before allowing an arming event for system 40.

Figure 5:
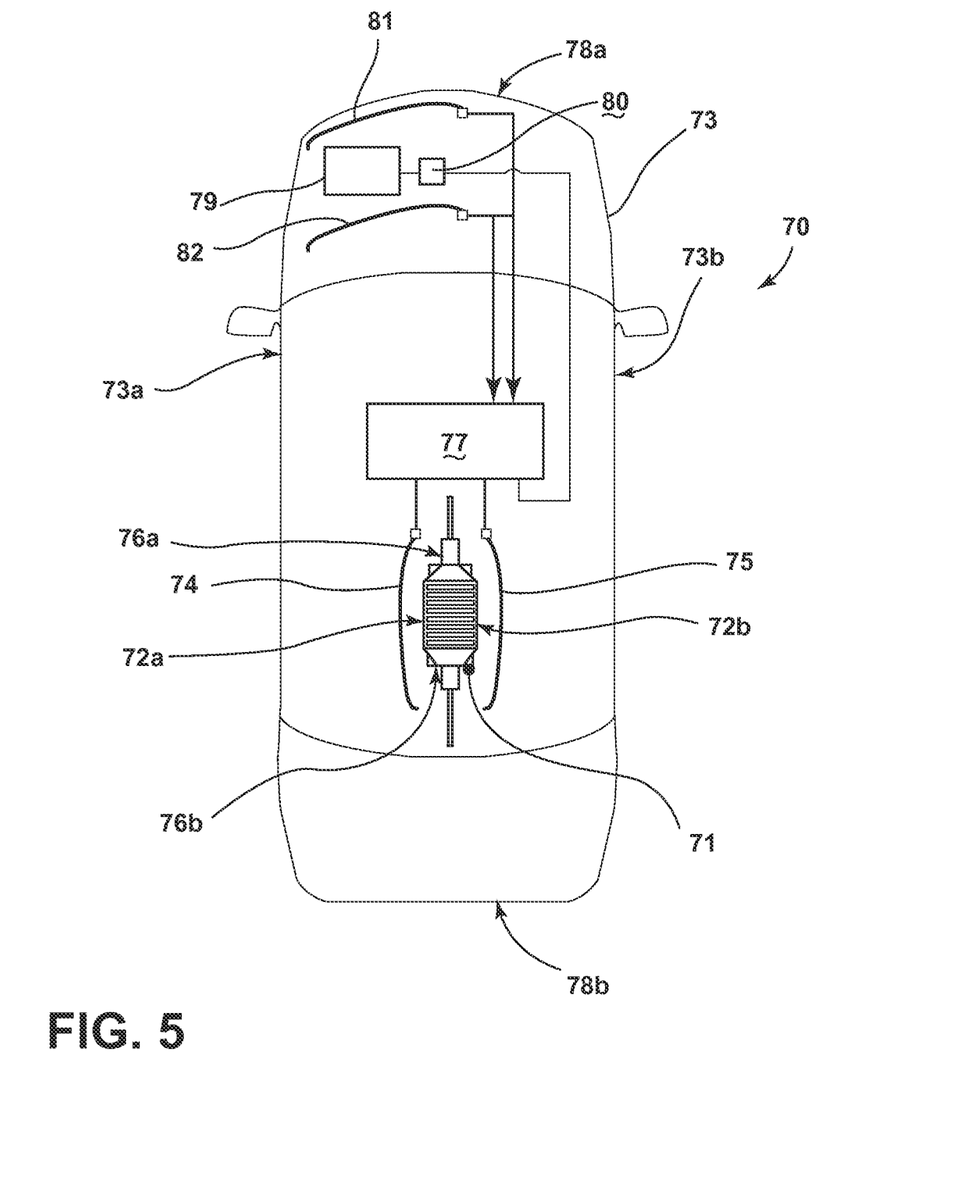
FIG. 5 is a plan view schematic of a proximity-based catalytic converter protection system according to an additional embodiment.

According to an additional embodiment shown in FIG. 5, a proximity-based catalytic converter protection system 70 may be employed to protect the integrity of a catalytic converter 71 in a vehicle 73. System 70 includes a pair of electrodes 74 and 75, both electrically coupled to controller 77. As shown in FIG. 5, catalytic converter 71 includes a left side 72a, right side 72b, front portion 76a, and rear portion 76b. Similarly, vehicle 73 includes a left side 73a, right side 73b, front portion 78a, and rear portion 78b.

Electrodes 74 and 75 are located in proximity to the left side 72a and right side 72b, respectively, of catalytic converter 71 (see FIG. 5). Electrodes 74 and 75 may be fabricated from materials in order to optimize the detection of changes in capacitance between them. Electrodes 74 and 75 may also be located in proximity to the front portion 76a and rear portion 76b of catalytic converter 71. Further, electrodes 74 and 75 can be located in other orientations provided that they are in proximity to two opposed sides or surfaces of catalytic converter 71 (e.g., front and rear portions 76a and 76b, respectively).

Controller 77 is configured within protection system 70 to monitor the capacitance between electrodes 74 and 75 to detect movement of objects external to vehicle 73 and in proximity to converter 71. Movement of objects, animals and/or individuals in proximity to the catalytic converter 71 will cause changes in the capacitance measured between electrodes 74 and 75 relative to a baseline threshold value. Using this data, controller 77 can assess whether unauthorized individuals and/or objects used by unauthorized individuals remain in the presence of catalytic converter 71. One advantage of system 70 is that it can detect the presence of an unauthorized individual in proximity to the converter 71 before he or she tampers with or otherwise attempts to remove the catalytic converter 71.

Protection system 70 may employ controller 77 to alert an unauthorized individual in proximity to the converter 71 before that person has damaged the vehicle 73 and/or the converter 71. Optionally, controller 77 may be electrically coupled to an alarm element 80 to activate an alarm that signals the unauthorized individual or others in the immediate vicinity of vehicle 73. Alarm element 80 may also be used to signal others in remote locations, including the vehicle owner, of the presence of such unauthorized individuals and/or objects in proximity to the converter 71. It should be understood that alarm element 80 is comparable to the alarm element 20 employed in protection system 10 (see, e.g., FIGS. 1, 1A). Further, alarm element 80 may be configured as a variable-output type alarm component capable of generating a plurality of alarm signals. For instance, alarm element 80 may be a vehicle horn capable of producing variable decibel levels, or a signal light capable of producing variable light intensity levels.

By measuring the capacitance between electrodes 74 and 75, controller 77 may detect the presence of unauthorized individuals (e.g., would-be catalytic converter thieves), animals, or objects (e.g., equipment to be used for theft and/or tampering of the catalytic converter) in proximity to the catalytic converter 71. In one detection approach, controller 77 may compare the measured capacitance between electrodes 74 and 75 to a predetermined capacitance threshold value. The threshold capacitance value is based on the measured capacitance between electrodes 74 and 75 in a normal operating state with no unauthorized individuals, animals, or objects between the electrodes. Accordingly, a capacitance level detected by controller 77 that exceeds the threshold may be indicative of the presence of an unauthorized person, animal, or object. Controller 77 may then sound an alarm via alarm element 80 upon measuring a capacitance level above this threshold.

In another approach, controller 77 is configured to filter out false positive readings from transient responses that are not indicative of the presence of an unauthorized individual or object in proximity to the converter 71. For example, the presence of cats, dogs, rodents, sticks or grass that move under the vehicle 73 from the wind, and other such effects can produce changes in the capacitance level between electrodes 74 and 75 measured by controller 77. Since these situations are frequently of a short duration and/or create changes in capacitance levels below those caused by the presence of unauthorized individuals and/or objects, it is possible for controller 77 to filter them out as drift.

Similarly, weather conditions (e.g., accumulation of snow, ice, dirt, etc.) can cause small changes to the capacitance measured between electrodes 74 and 75 over a relatively long period time. Accordingly, these changes may exceed a given threshold over a long period of time, but are different in character than the abrupt changes over a short period of time caused by the presence of unauthorized individuals and/or objects in proximity to converter 71. In one such detection scheme, for example, controller 77 will only cause the activation of an alarm element 80 upon detecting a change in capacitance between electrodes 74 and 75 that exceeds a predetermined capacitance threshold over a predetermined time period. Using these two threshold values, protection system 70 can employ controller 77 to filter out false positive readings not indicative of the presence of unauthorized individuals and/or objects.

According to another detection scheme, controller 77 may activate alarm element 80 to a first output level upon the detection of a change in the capacitance between electrodes 74 and 75 that exceeds a first predetermined threshold over a first predetermined time period. This first alarm level may be comparable to a warning indication. That warning indication may be used to spur rodents, pets and other animals to move away from the catalytic converter 71. In some instances, the warning indication could also spur unauthorized individuals that may have only partially entered the detection zone between electrodes 74 and 75 to move away from the vehicle. However, at this point, the protection system 70 is more likely to be faced with the need to assess whether the measured capacitance level between electrodes 74 and 75 is actually caused by an unauthorized individual, animal, or object. Accordingly, the detection scheme calls for controller 77 to activate alarm element 80 to a second, full-alarm level upon the detection of a change in the capacitance level between electrodes 74 and 75 that exceeds a second predetermined threshold over a second predetermined time period. Various schemes can be employed to tune out false positives from transient conditions (e.g., rodents) that are not indicative of the presence of unauthorized individuals or objects in proximity to catalytic converter 71. It should be understood that the detection scheme used by controller 77 may employ various threshold capacitance levels, threshold durations for such changes, and multiple levels of such thresholds to effectively distinguish between the presence of unauthorized individuals and objects in proximity to the converter 71, and false positives from other transient conditions. Such schemes can be developed by routine experimentation to assess the changes in capacitance observed between electrodes 74 and 75 caused by various likely transient conditions not indicative of the presence of unauthorized individuals and objects in proximity to the catalytic converter 71.

Protection system 70 optionally may employ a subsystem to protect a power source 79 electrically coupled to controller 77 and alarm element 80 (see FIG. 5). In particular, system 70 may include electrodes 81 and 82 that are located in proximity to the power source 79. These electrodes 81 and 82 can be arranged in proximity to two opposing sides of the power source 79, analogous to the electrodes 74 and 75 arranged in proximity to the left and right sides 72a and 72b (or front and rear portions 76a and 76b) of catalytic converter 71. When system 70 is arranged with electrodes 81 and 82 in proximity to power source 79, controller 77 may also monitor the capacitance changes between electrodes 81 and 82 to detect movement of unauthorized individuals and objects in proximity to the power source 79. The schemes described earlier to disregard false positives and detect such unauthorized individuals and objects in connection with catalytic converter 71 can be similarly employed for the detection of such individuals and objects near the power source 79. Further, the alarm element 80 (e.g., a horn, siren, or other alarm device) can be located inside the detection zone of electrodes 81 and 82, or inside the zone formed by electrodes 74 and 75. This provides protection against tampering with alarm element 80.

Figure 6A:
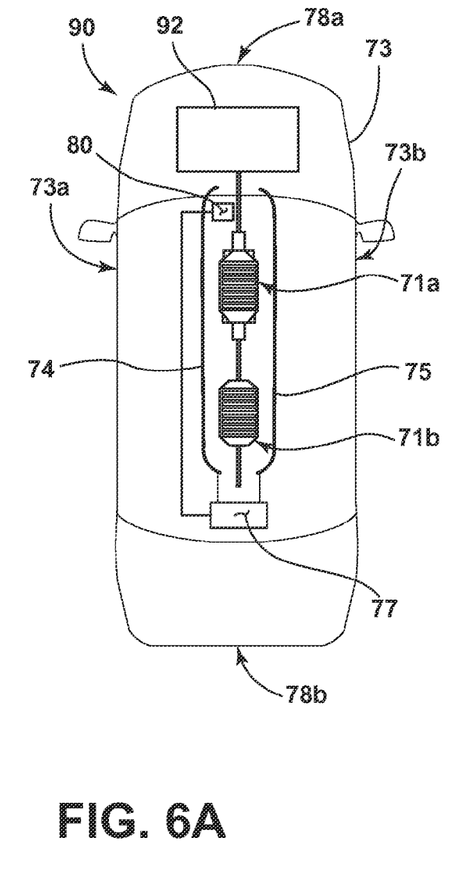
FIG. 6A is a plan view schematic of a proximity-based catalytic converter protection system for use with two catalytic converters according to another embodiment.
Figure 6B:
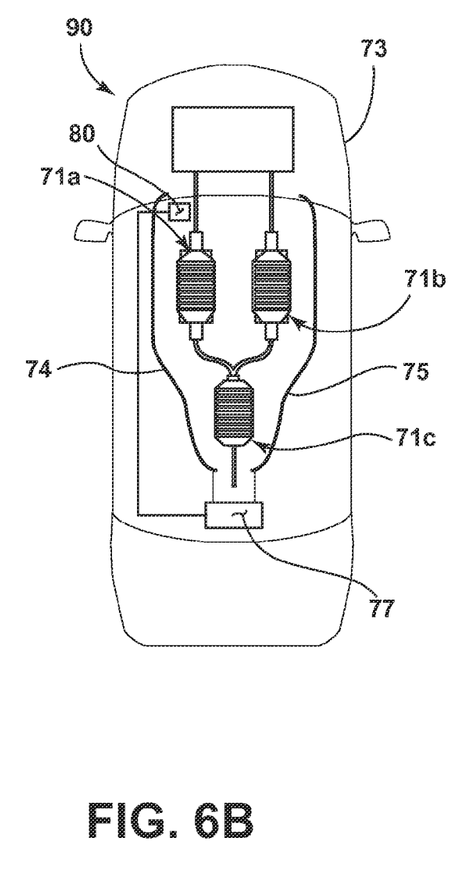
FIG. 6B is a plan view schematic of a proximity-based catalytic converter protection system for use with three catalytic converters according to a further embodiment.
Figure 6C:
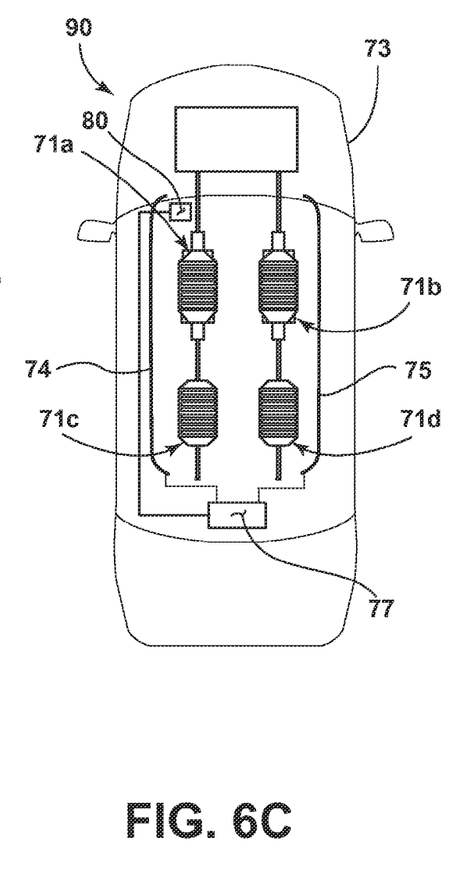
FIG. 6C is a plan view schematic of a proximity-based catalytic converter protection system for use with four catalytic converters according to an additional embodiment.

According to other embodiments shown in FIGS. 6A-6C, proximity-based catalytic converter protection system 90 can be employed to detect the presence of unauthorized individuals and objects in proximity to a plurality of catalytic converters (i.e., converters 71a, 71b, 71c, 71d, etc.) located in a given vehicle 73 and arranged in connection to the exhaust system (not shown) of engine 92. The components and detection schemes employed by system 90 are nearly identical to those employed by protection system 70. For example, a pair of electrodes 74 and 75 are utilized by controller 77 to detect changes in capacitance associated with the presence of unauthorized individuals and objects in proximity to one or more of the plurality of converters 71a, 71b, 71c and 71d. The broad coverage provided by electrodes 74 and 75 used in proximity-based protection system 90 can provide cost savings over resistance-based systems (e.g., system 10) used in vehicles with a plurality of catalytic converters. This is because the resistance-based systems generally require multiple resistor elements and monitoring circuits for each catalytic converter.

In system 90, the electrodes 74 and 75 may be located along left and right sides of the vehicle 73a and 73b, respectively. Further, electrode 74 may be located in proximity to the left side of the left-most converters 71a and 71c in vehicle 73 (see, e.g., FIG. 6C). Similarly, electrode 75 may be located in proximity to the right side of the right-most converters 71b and 71d in vehicle 73 (see, e.g., FIG. 6C). In general, the goal is to employ electrodes 74 and 75 such that they define an area between them that effectively covers the plurality of catalytic converters 71a, 71b, 71c and 71d. For example, electrodes 74 and 75 may also be located near the front and rear portions 78a and 78b of the vehicle 73 to straddle the plurality of converters 71a, 71b, 71c and 71d. Consequently, protection system 90 can employ electrodes 74 and 75 to detect capacitance changes associated with movement in proximity to any of the plurality of converters 71*a*, 71*b*, 71*c* and/or 71*d* employed in vehicle 73. Further, the alarm element 80 can be located in the detection zone of electrodes 74 and 75 to provide protection against tampering with alarm element 80.

Figure 7:
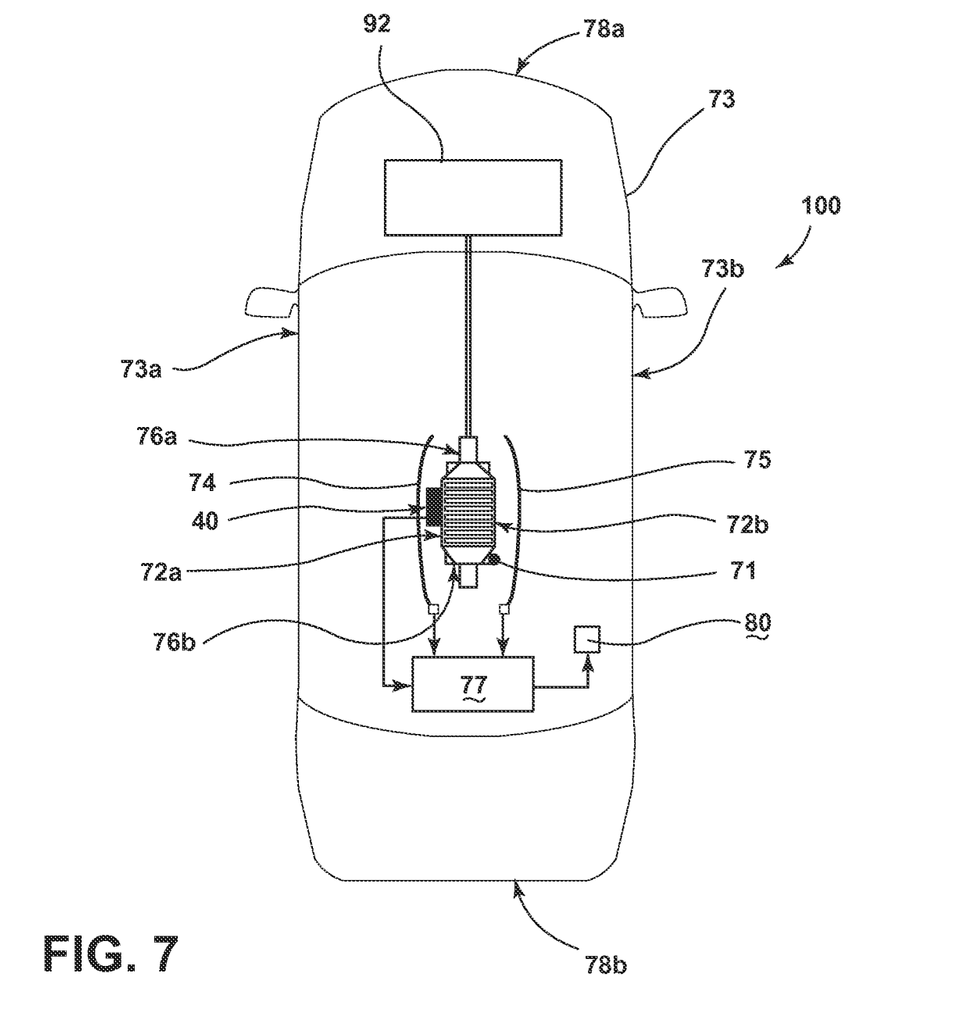
FIG. 7 is a plan view schematic of a proximity and resistance-based catalytic converter protection system according to a still further embodiment.

Referring to FIG. 7, catalytic converter protection system 100 is arranged to protect a catalytic converter 71 located in a vehicle 73 (e.g., as arranged in the exhaust system of engine 92) using both resistance- and proximity-based components. System 100, as shown, employs the same components as proximity-based protection system 70 (see, e.g., FIG. 5). In particular, controller 77 is arranged to detect the capacitance between electrodes 74 and 75 caused by the presence of unauthorized individuals and objects in proximity to converter 71. In addition, the resistance-based protection system 40 (see FIGS. 3 and 3A) is integrated within protection system 100 as shown. As depicted in FIG. 7, however, system 40 relies on controller 77 in place of controller 57. As such, controller 77 may monitor both the capacitance changes between electrodes 74 and 75, along with changes in the resistance of the internal resistor 53 in the circuit defined by controller 77, connections 55 and 56, shorting element 44, and terminals 45 and 46. These data can be used by controller 77 to filter false positive readings and effectively detect the presence of unauthorized individuals and objects in proximity to the converter 71. In addition, protection system 100 may be employed with a plurality of converters (e.g., converters 71*a*, 71*b*, 71*c*, 71*d*, etc.) as generally depicted in FIGS. 6A-6B, configured to include the resistance-based system 40.

Variations and modifications can be made to the aforementioned structure without departing from the concepts of the present invention. Further, such concepts are intended to be covered by the following claims unless these claims by their language expressly state otherwise.

We claim:

1. A catalytic converter protection system, comprising:
   a controller;
   a catalytic converter having a housing;
   a shorting element that has two terminals and is mechanically attached to the housing; and
   a connector having an internal resistor, the connector electrically coupled to the controller and removably attached to the two terminals,
   wherein the controller monitors resistance of the internal resistor to determine continuity between the connector and the shorting element.

2. The system of claim 1, wherein the connector encapsulates the internal resistor and comprises a body molded from an electrically-insulating and heat-resistant material.

3. The system of claim 1, wherein the controller also accounts for changes in the resistance of the internal resistor as a function of temperature.

4. The system of claim 3, further comprising:
   a catalytic converter temperature sensor that is coupled to the converter and generates a catalytic converter temperature signal received by the controller,
   wherein the controller monitors the catalytic converter temperature signal and the resistance of the internal resistor to determine the continuity between the connector and the shorting element.

5. The system of claim 1, wherein the controller continuously monitors the resistance of the internal resistor to determine the continuity between the terminals and the shorting element.

6. The system of claim 1, further comprising:
   an alarm element electrically coupled to the controller,
   wherein the controller activates the alarm element upon determining a loss in continuity between the terminals and the shorting element.

7. The system of claim 6, wherein the alarm element is selected from the group consisting of an audible alarm element, a visual alarm element, and a wireless alarm transmitter element.

8. A catalytic converter protection system, comprising:
   a vehicle alarm system having a controller;
   a catalytic converter having a housing;
   a shorting element that has two terminals and is mechanically attached to the housing; and
   a connector having an embedded resistor, the connector electrically coupled to the controller and removably attached to the two terminals,
   wherein the controller determines continuity of the alarm system and the continuity between the connector and the shorting element.

9. The system of claim 8, wherein the connector comprises a body molded from an electrically-insulating and heat-resistant material.

10. The system of claim 8, wherein the controller also accounts for changes in the resistance of the internal resistor as a function of temperature.

11. The system of claim 10, further comprising:
    a catalytic converter temperature sensor that is coupled to the converter and generates a catalytic converter temperature signal received by the controller,
    wherein the controller monitors the catalytic converter temperature signal and the resistance of the internal resistor to determine continuity between the connector and the shorting element.

12. The system of claim 8, wherein the controller continuously monitors the resistance of the internal resistor to determine continuity between the connector and the shorting element.

13. The system of claim 8, further comprising:
    an alarm element electrically coupled to the controller,
    wherein the controller activates the alarm element upon determining a loss in continuity between the connector and the shorting element.

14. The system of claim 13, wherein the alarm element is selected from the group consisting of an audible alarm element, a visual alarm element, and a wireless alarm transmitter element.

15. A catalytic converter protection system, comprising:
    a controller;
    a catalytic converter having a housing;
    a shorting element having two terminals and mechanically attached to the housing; and
    a connector having a resistor with a pre-set resistance, the connector electrically coupled to the controller and removably attached to the terminals,
    wherein the controller determines continuity between the connector and the shorting element by measuring a resistance of the resistor and comparing it to the pre-set resistance.

16. The system of claim 15, wherein the connector encapsulates the resistor and comprises a body molded from an electrically-insulating and heat-resistant material.

17. The system of claim 15, further comprising:
    a catalytic converter temperature sensor that is coupled to the converter and generates a catalytic converter temperature signal received by the controller,
    wherein the controller monitors the catalytic converter temperature signal, the current resistance of the internal resistor, and the pre-set resistance of the resistor to determine continuity between the connector and the shorting element.

18. The system of claim 15, wherein the controller continuously determines continuity between the connector and the shorting element by comparing the current resistance of the resistor to the pre-set resistance of the resistor.

19. The system of claim 15, further comprising:
an alarm element electrically coupled to the controller,
wherein the controller activates the alarm element upon determining a loss in continuity between the connector and the shorting element.

20. The system of claim 19, wherein the alarm element is selected from the group consisting of an audible alarm element, a visual alarm element, and a wireless alarm transmitter element.

* * * * *